(12) United States Patent
Juric et al.

(10) Patent No.: US 8,212,939 B2
(45) Date of Patent: Jul. 3, 2012

(54) NON-INTRUSIVE DETERMINATION OF AN OBJECTIVE MEAN OPINION SCORE OF A VIDEO SEQUENCE

(75) Inventors: Pero Juric, Langendorf (CH); René Widmer, Hasle b. B. (CH)

(73) Assignee: Swissqual License AG (CH)

( * ) Notice: Subject to any disclaimer, the term of this patent is extended or adjusted under 35 U.S.C. 154(b) by 1083 days.

(21) Appl. No.: 12/094,084

(22) PCT Filed: Dec. 23, 2005

(86) PCT No.: PCT/CH2005/000771
§ 371 (c)(1),
(2), (4) Date: May 16, 2008

(87) PCT Pub. No.: WO2007/071076
PCT Pub. Date: Jun. 28, 2007

(65) Prior Publication Data
US 2008/0284853 A1     Nov. 20, 2008

(51) Int. Cl.
*H04N 17/00* (2006.01)
*H04N 7/12* (2006.01)
*H04N 5/14* (2006.01)
*G06F 15/173* (2006.01)

(52) U.S. Cl. ......... 348/700; 348/192; 375/240; 709/224

(58) Field of Classification Search ................... 348/700; 375/240
See application file for complete search history.

(56) References Cited

U.S. PATENT DOCUMENTS

| | | | |
|---|---|---|---|
| 5,553,014 A * | 9/1996 | De Leon et al. | ............... 708/322 |
| 5,801,765 A | 9/1998 | Gotoh et al. | |
| 6,408,024 B1 | 6/2002 | Nagao et al. | |
| 6,496,221 B1 * | 12/2002 | Wolf et al. | ..................... 348/192 |
| 6,600,835 B1 * | 7/2003 | Ishikawa | ........................ 382/236 |
| 7,110,454 B1 * | 9/2006 | Chakraborty | ............. 375/240.16 |
| 2002/0186768 A1 * | 12/2002 | Dimitrova et al. | ........ 375/240.12 |
| 2003/0046384 A1 * | 3/2003 | Sirivara et al. | ................ 709/224 |
| 2004/0008892 A1 * | 1/2004 | Hill et al. | ...................... 382/228 |
| 2005/0094901 A1 * | 5/2005 | Seol et al. | ...................... 382/305 |
| 2006/0072832 A1 * | 4/2006 | Nemiroff et al. | ............. 382/232 |

OTHER PUBLICATIONS

Stephen Wolf, Measuring the End-to-End Performance of Digital Video System, IEEE Transactions on Broadcasting, vol. 43, No. 3, Sep. 1997.*

International Search Report of PCT/CH2005/000771 dated Sep. 28, 2006.

(Continued)

*Primary Examiner* — Joseph Ustaris
*Assistant Examiner* — Xiaolan Xu
(74) *Attorney, Agent, or Firm* — Ostrolenk Faber LLP

(57) ABSTRACT

According to the described method, interframe similarities $s(i)$ are calculated for the frames of the video sequence, each interframe similarity $s(i)$ being indicative of the similarity of two consecutive frames $i-1$, $i$. As it has been found, an analysis of the interframe similarities allows to determine various parameters that are characteristic for the mean opinion score MOS, such as the downsampling rate, pausing, or a noise-dependence of the interframe similarity at the keyframes. An objective mean opinion score MOSo being a value close to the mean opinion score is derived as a value linear in the pausing parameter, a keyframe distance parameter and further quality parameters measured in the spatial domain, corrected by a second value being an exponential model in the downsampling rate.

12 Claims, 7 Drawing Sheets

OTHER PUBLICATIONS

Radim Javurek, "Efficient Models for Objective Video Quality Assessment", Dec. 2004, Radioengineering, vol. 13, No. 4, pp. 48-50.

Ahmed M. Eskicioglu, "Quality Management for Monochrome Compressed Images in the Past 25 Years", 2000 IEEE International Conference on Acoustics, Speech and Signal Processing (ICASSP 2000), Proceedings, vol. 6, pp. 1907-1910.

Yong Wang et al., "Content-Based Utility Function Prediction for Real-Time MPEG-4 Video Transcoding," 2003 International Conference on Image Proceedings (ICIP 2003), Proceedings, vol. 2, pp. 189-192.

Philip Palmer, "Family Films," Jul. 2003, Scriptwriter, No. 11, pp. 30-33.

Zhou Wang et al., "Blind Measurement of Blocking Artifacts in Images," Sep. 2000, IEEE International Conference in Image Processing, Proceedings, vol. 3, pp. 981-984.

Sabine Susstrunk et al., "Color Image Quality on the Internet," 2004, IS&T/SPIE Electronic Imaging 2004: Internet Imaging V, Proceedings, vol. 5304, pp. 118-131.

Zhou Wang et al., "Video Quality Assessment Using Structural Distortion Measurement" 2002, IEEE International Conference on Image Processing, Proceedings, vol. 3, pp. 65-68.

* cited by examiner

NON-INTRUSIVE DETERMINATION OF AN OBJECTIVE MEAN OPINION SCORE OF A VIDEO SEQUENCE

CROSS-REFERENCE TO RELATED APPLICATION

The present application is a 35 U.S.C. §§371 national phase conversion of PCT/CH2005/000771, filed Dec. 23, 2005, the disclosure of which has been incorporated herein by reference. The PCT International Application was published in the English language.

TECHNICAL FIELD

The invention relates to a method for assessing the quality of a video sequence. In particular, the method automatically attributes an "objective mean opinion score" MOSo to the sequence, which is a score value that is indicative of a mean opinion score MOS that the sequence is expected to have when viewed by a group of human watchers.

BACKGROUND ART

The assessment of the quality of a video sequence is of importance when characterizing the performance of a video distribution network, of a transmission or compression algorithm, or of any other hard- or software involved in the creation, transmission, storage, rendering or handling of video data.

Depending on the test situation, the original video sequence may or may not be available when assessing the quality of a given sequence. The present invention relates to so called "no reference models", where the quality of a potentially imperfect video sequence has to be derived without knowledge of the original video sequence.

For example, an unknown video sequence is captured at the receiving end of a video transmission channel and then used as an input for video quality rating. The main output is a video rating score or objective video MOS.

Conventionally, the video quality rating is carried out by a group of human watchers, where each member of the group attributes an opinion score to the sequence. The scores of a plurality of test watchers can be averaged to obtain a mean opinion score.

It is desirable to automate this process, replacing the subjective element of the test watchers with an automated method suitable to yield a value close to the mean opinion score, the so called "objective mean opinion score" MOSo.

DISCLOSURE OF THE INVENTION

Hence, it is a general object of the invention to provide a method of this type that provides a basis for generating a result close to the mean opinion score.

According to this method, interframe similarities $s(i)$ are calculated for the frames of the video sequence, each interframe similarity $s(i)$ being indicative of the similarity of two consecutive frames $i-1, i$. As it has been found, an analysis of these interframe similarities allows the determination of various parameters that are characteristic for the mean opinion score MOS. Hence, the similarities $s(i)$ can be used in the calculation of the MOSo.

One advantageous application of the interframe similarities $s(i)$ is the determination of the downsampling factor DS, which in turn can be used for calculating said score MOSo.

Another advantageous application of the interframe similarities $s(i)$ is the determination of the pausing parameter p, which in turn can also be used for calculating said score MOSo. The pausing parameter is indicative of any pausing in the sequence.

A further advantageous application of the interframe similarities $s(i)$ is the determination of a keyframe distance parameter KFD, which in turn can also be used for calculating said score MOSo. This parameter is of importance for video sequences where some of the frames of the sequence were transmitted as keyframes and some of the frames were transmitted as non-keyframes, wherein the keyframes carry full information for creating a frame without reference to a prior frame and the non-keyframes carry incremental information for creating a frame from a previous frame. In this case, the keyframes can be identified by checking if the interframe similarity $s(i)$ for a frame lies in a given range. From the interframe similarities $s(i)$ at the keyframes a keyframe distance parameter KFD can be determined, which e.g. describes how much, on an average, the keyframes differ from their previous frames. A large difference indicates a poor video quality.

The invention also relates to the use of this method for determining the quality of a video transmission channel.

BRIEF DESCRIPTION OF THE DRAWINGS

The invention will be better understood and objects other than those set forth above will become apparent when consideration is given to the following detailed description thereof. Such description makes reference to the annexed drawings, wherein.

MODES FOR CARRYING OUT THE INVENTION

In the following, we describe an advantageous embodiment (and some variants thereof) of an algorithm implementing the present invention. This description is detailed, but does not limit the scope of protection defined in the claims.

Definitions

The following definitions are used in this text and the claims:

"Downsampling" is the rate by which a video sequence is downsampled during transmission, a measure that is used intentionally by many transmission techniques to reduce transmission bandwidth. Downsampling involves a skipping of individual frames, wherein the skipped frames are distributed substantially regularly over time. For example, each second frame may be skipped, which corresponds to a downsampling factor of 2.

"Pausing" is, in some way, similar to downsampling in that one or more frames are not received properly and can therefore not be displayed. However, in contrast to downsampling, pausing is an unintentional effect and skipped frames are not distributed regularly.

Main Structure of the Algorithm

Figure 1:
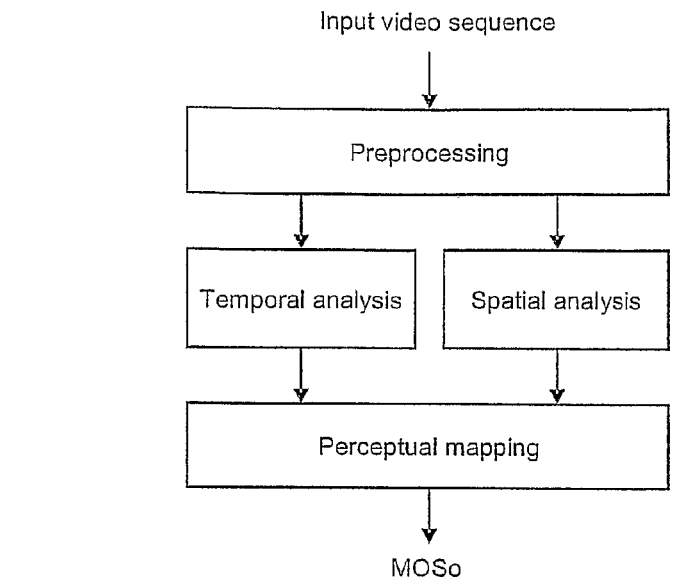
FIG. 1 is a block diagram of an embodiment of a method incorporating the present invention.

The method described here contains various parts, which all contribute to the objective mean opinion score MOSo:
Preprocessing
Temporal analysis
Spatial analysis
Perceptual Mapping FIG. 1 illustrates these parts. The input for the method is a video file containing an uncompressed video sequence consisting of a succession of frames. Each frame is e.g. encoded in the RGB or YUV format. A typical length of the video sequence is 6 to 15 seconds.

The input video sequence is first passed through a preprocessing step, which transforms the frames into other formats, such as YCbCr, HSV and RGB, each of which has certain advantages depending on the analysis that follows.

The result of the preprocessing step is fed to a first block called temporal analysis and a second block called spatial analysis.

The primary purpose of the temporal analysis is the determination of the interframe similarities of the individual video frames and of parameters derived from the same. In particular, it calculates the keyframe distance, the frame rate downsampling factor and video pausing. These techniques are in close context to the present invention and are described in detail below.

The primary purpose of the spatial analysis is the determination of spatial parameters describing each frame individually. The spatial parameters can e.g. describe the average blurriness and noise level of the frames. Various suitable techniques that can be used for spatial analysis are known to the person skilled in the art. The details of the spatial analysis are of no importance to the present invention.

Typical video quality parameters measured in a spatial domain are blurring and blockiness (blocking). Examples for Blocking and blurring detection are described in the following papers:
1) Z. Wang, A. C. Bovik, and B. L. Evans, "Blind measurement of blocking artifacts in images," in Proc. IEEE Int. Conf. Image Proc., vol. 3, September 2000, pp. 981-984
2) "Color image quality on the Internet", Sabine E. Susstrunk, Ecole Polytechnique Federale de Lausanne (Switzerland); Stefan Winkler, Ecole Polytechnique Federale de Lausanne (Switzerland); pages 118-131. In: IS&T The Society for Imaging Science and Technology, http://www.imaging.org/store/physpub.cfm?seriesid=24&pubi d=598; Simone Santini, Univ. of California/San Diego (USA); Raimondo Schettini, Univ. degli Studi di Milano-Bicocca (Italy), San Jose, Calif., Dec. 15, 2003, Volume 5304, No. 5304, ISBN/ISSN: 0-8194-5207-6

A further step titled perceptual mapping combines the parameters calculated from the temporal and spatial analysis to a single video quality number called objective mean opinion score MOSo. Further details of the perceptual mapping are described below.

Preprocessing

As mentioned above, a main purpose of the preprocessing step is the conversion of the input frame format to HSV, YCbCr and RGB. Typical formats for uncompressed video signals are RGB and YUV. Additionally, preprocessing involves some video preparation in order to avoid the processing of the video frames containing unique color. Additionally a grade of similarity between two consecutive video frames, the interframe similarity, is calculated as a part of preprocessing step. Its result is then used in the temporal analysis step as described later.

Interframe Similarity

The video sequence is a series of frames i, which generally differ from each other (unless two frames are identical, e.g. due to pausing or downsampling). In the present method, an interframe similarity s(i) is attributed to each frame i. It describes how much frame i differs from previous frame i−1.

The interframe similarities s(i) are the basis for all computations in the temporal analysis. Therefore, the accuracy and robustness of the used interframe similarities are significant. Interframe similarity results can also be used in the spatial analysis acting as an indicator whether results from previous frames just can be repeated or an analysis of the new frame is required.

Various definitions of the interframe similarities s(i) can be used. They differ in robustness, computational effort and sensitivity to certain types of frame changes. In the following, we describe two of them, one of them using the Y-component of the YCbCr representation of the frames, the other analyzing a histogram of the HSV representation of the frames.

a) Using the Y Component

One of the simplest methods for comparing two frames is to calculate an average value $Y_{i-1}$ of all pixels belonging to a frame i−1 using only the Y component of YCbCr signal and do the same for the next frame i. Then, the normalized difference Δ, which can be used as the interframe similarity s(i), can be calculated from $$Y_{i-1} = \frac{1}{Tot_H \cdot Tot_V} \sum_{h=1}^{Tot_H} \sum_{v=1}^{Tot_V} y_{h,v,i-1} \quad (1)$$

$$Y_i = \frac{1}{Tot_H \cdot Tot_V} \sum_{h=1}^{Tot_H} \sum_{v=1}^{Tot_V} y_{h,v,i} \quad (2)$$

$$s(i) = \Delta = Y_i - Y_{i-1} \quad (3)$$

wherein $Tot_H$ and $Tot_V$ designate the horizontal and vertical extension of each frame in pixels, and $Y_{h,v,i}$ is the Y-value of the pixel at horizontal offset h and vertical offset v in frame i.

The interframe similarity as defined in Eqs. (1) to (3) is 0 if two consecutive frames i−1 and i are equal and ≠0 if not.

b) HSV Histogram

A more advanced method for calculating the interframe distances s(i) makes use of HSV color space using not only an average value but rather a histogram of all three components H, S and V.

Figure 2:
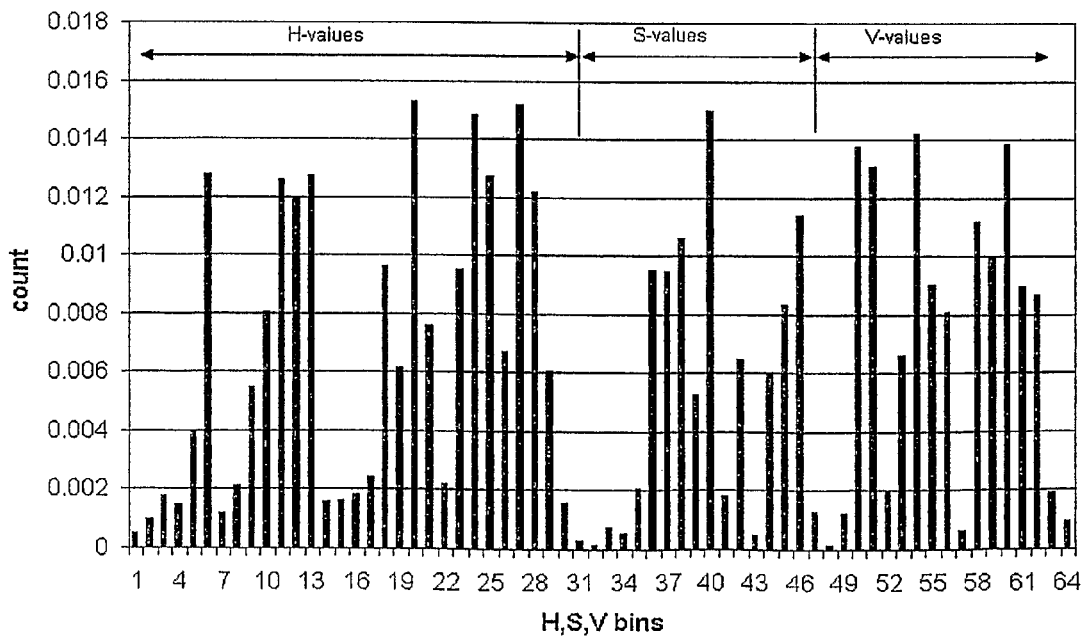
FIG. 2 is a histogram showing the result of binning the H, S and V values of a frame.
Figure 5:
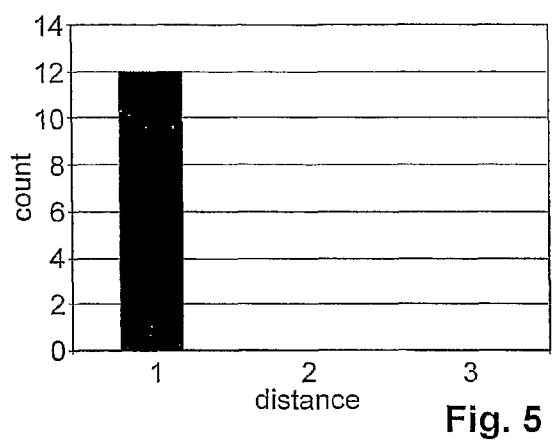
FIG. 5 is a histogram of the binned interframe distances for a downsampling factor of 1.
Figure 7:
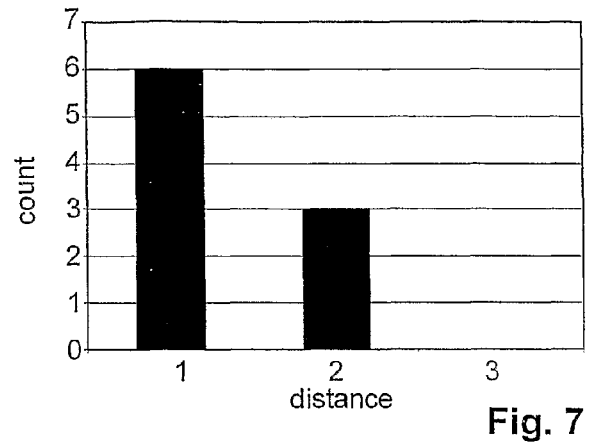
FIG. 7 is a histogram of the binned interframe distances for a downsampling factor of 1.33.

The method is based on the following steps:
Binning the H, S and V-values of all pixels of a frame. The H values are binned into 32 bins since it has, perceptually, the highest resolution, while the S and V values are each binned into only 16 bins. Each bin corresponds to a range of the H, S or V value, respectively, and it counts the number of pixels having an H, S or V value, respectively, that falls into the range of the bin. An example of a histogram where the H, S and V bins are shown as 64 consecutive bins in a row is shown in FIG. 2. The vertical axis of the graph of FIG. 5 has been normalized by dividing the bin values by the total number of values in the histogram, which is $3 \cdot \text{TOt}_H \cdot \text{Tot}_V$.

Calculating a difference between the binned H, S and V values. Advantageously, the following equation is used $$s(i) = \sum_{k=0}^{K-1} \min(H_i(k), H_{i-1}(k)), \quad (4)$$

where K designates the total number of bins (64 in the example of FIG. 2) and $H_i(k)$ is the count of bin k of frame i.

Figure 3:
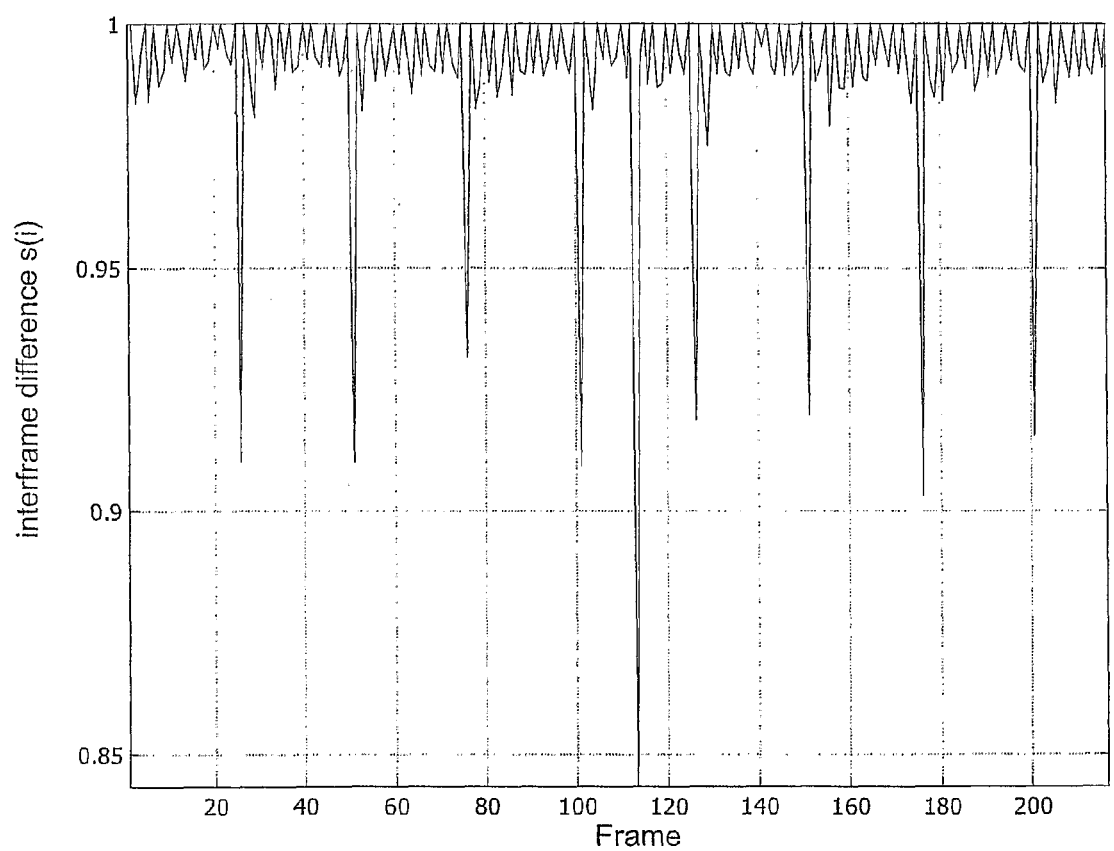
FIG. 3 shows a typical interframe similarity $s(i)$ for a video sequence.

The interframe similarity s(i) as defined by Eq. (4) is 1 if two consecutive frames are identical and smaller than 1 if not. FIG. 3 shows a typical plot of the interframe similarity s(i) for s series of some 220 frames.

It must be noted that other definitions of the interframe similarity s(i) than the one of Eq. (3) or (4) can be used. In general, the term interframe similarity s(i) designates any parameter that expresses the similarity or dissimilarity of consecutive frames.

Temporal Analysis

The interframe similarities s(i) can be used, as mentioned, in the temporal analysis. In particular, they can be used to calculate one or more of the following three parameters:
downsampling factor DS
pausing parameter p
keyframe distance parameter KFD The definition and calculation of these parameters is described in the following.

Downsampling Factor DS

Figure 4:
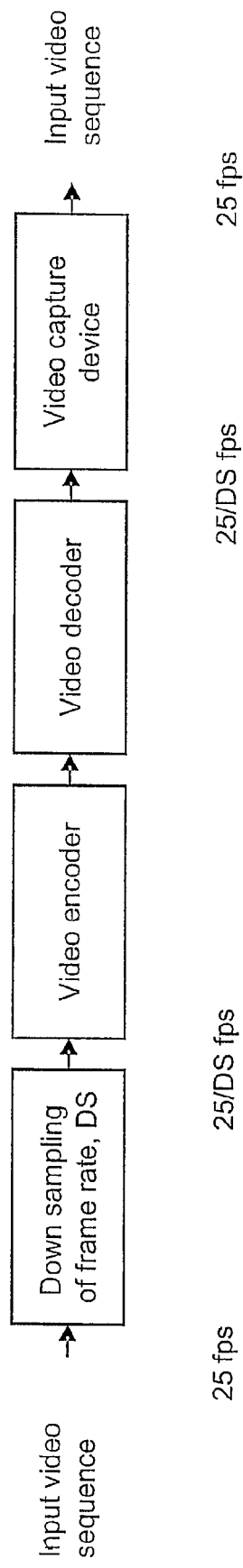
FIG. 4 illustrates the transmission of a video sequence with downsampling.

FIG. 4 shows a typical process of video encoding and decoding as well as a video capture device at the output of the video channel. Typically a source video sequence has a frame rate of 25 to 30 fps. Often a video transport channel offers lower bandwidth than the input source video sequence would require, and it is therefore necessary to reduce a frame rate of the source even before encoding. This downsampling procedure decreases a video quality.

FIG. 4 shows a video capture device at the receiving end. Typically, the video capture device works at 25 to 30 fps (i.e. the same frame rate as source video). Increasing the sampling rate to values higher than the one at the video output will not increase video quality since the so called native frame rate (at the input of the encoder) is still unchanged.

Since the downsampling of the frame rate is an irreversible process and decreases video quality, it is important to measure this feature and take it into account when calculating an overall video quality.

The downsampling estimation is based on assumption that the capturing rate of the video capture device is the same as the frame rate of the source video sequence. Alternatively, the capturing rate may be higher than the frame rate of the source video sequence.

For determining the downsampling rate, the present method makes use of a histogram approach as explained in the following.

In a first step, the interframe similarities s(i) are compared to a first threshold value k. In the following, it is assumed that the definition of Eq. (4) is used, in which case this first threshold value k is 1. Any value of s(i)<1 indicates that the frame contents have changed between frames i−1 and i.

Hence, comparing s(i) to 1 allows to determine the distance between frame changes. This distance is e.g. 1 if the frame rate is the original frame rate, and it can be larger than 1 in the presence of downsampling.

The distances between frame changes determined in this manner are binned into bins of width 1 to calculate a series of bin values H(i), with bin i corresponding to the interframe distance i. FIGS. 5-8 show example histograms of the values H(i) for different downsampling factors DS.

The downsampling factor DS is defined by:

$$DS = \frac{\text{Source\_fps}}{\text{native\_fps}}, \quad (5)$$

which is a ratio of source and native frame rates, the native framerate being the framerate before encoding and the source framerate being the framerate after encoding (capturing rate) and also of the reference video signal. Typical native frame rates in live networks lie between 2.5 and 25 fps, which means that the down sampling factor DS is between 10 and 1.

Figure 6:
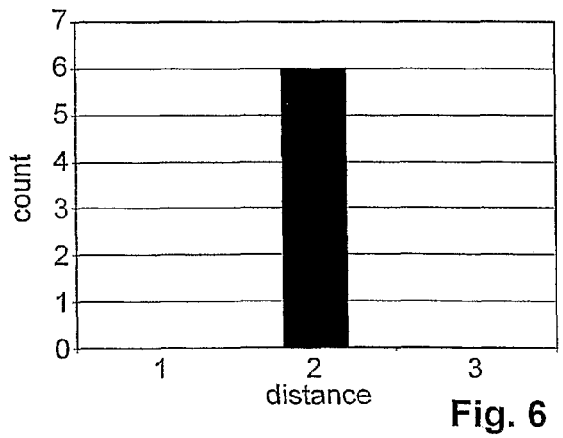
FIG. 6 is a histogram of the binned interframe distances for a downsampling factor of 2.
Figure 8:
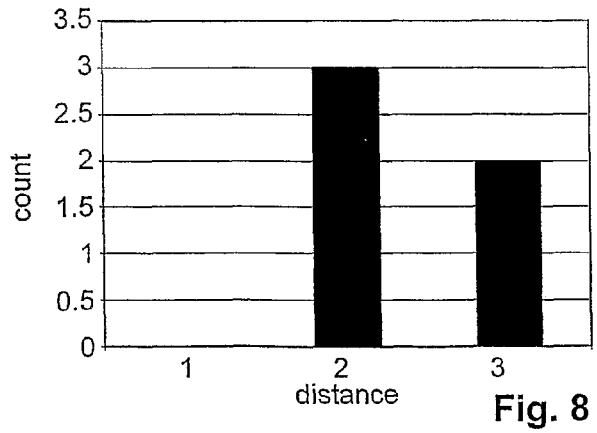
FIG. 8 is a histogram of the binned interframe distances for a downsampling factor of 2.4.

DS=1 means that the output frame rate is equal to the source one or there was no frame rate change in the transmission channel. In this case all distances have a value 1, see FIG. 5. If every second frame is skipped, the downsampling factor DS is 2, and the corresponding histogram is shown in FIG. 6. If the downsampling factor DS is not an integer number, then the histogram shows more than one peak. For example, if DS=1.33 (FIG. 7) we have e.g. 6 values with the distance 1 and three values with distance 2.

From the bin values H(i), the downsampling factor DS can be calculated from the following equation:

$$DS = \frac{i1 \cdot H(i1) + i2 \cdot H(i2)}{H(i1) + H(i2)} \quad (6)$$

where indices i1 and i2 correspond to the bins with the two largest bin values H(i1), H(i2).

Pausing Parameter p

Pausing estimation is used to detect events where a video channel causes information loss. In such a situation where video transmission is broken, a capturing device records always the same frame. In this case we talk about so called irregularly repeated frames which are different from those caused by downsampling effect. Downsampling causes periodical frame repetitions whereas pausing is much more annoying and occurs burstwise. Identification of pausing is very important for no reference models since this kind of degradation is very annoying and its impact is always perceived by the viewers.

In the method used here, the accuracy of pausing estimation depends on the result of the downsampling calculation.

A pausing estimator has to distinguish the irregularly repeated frames from those that are regularly repeated due to downsampling. By looking at FIG. 9, which shows another example of an interframe distance histogram (derived in the same way as the histograms of FIGS. 5-8) two different types of interframe distances can be distinguished. The two highest bars for distances 2 and 3 can be attributed to downsampling, while the bars at distances 5-9 represent irregular frame repetitions or pausing.

Figure 9:
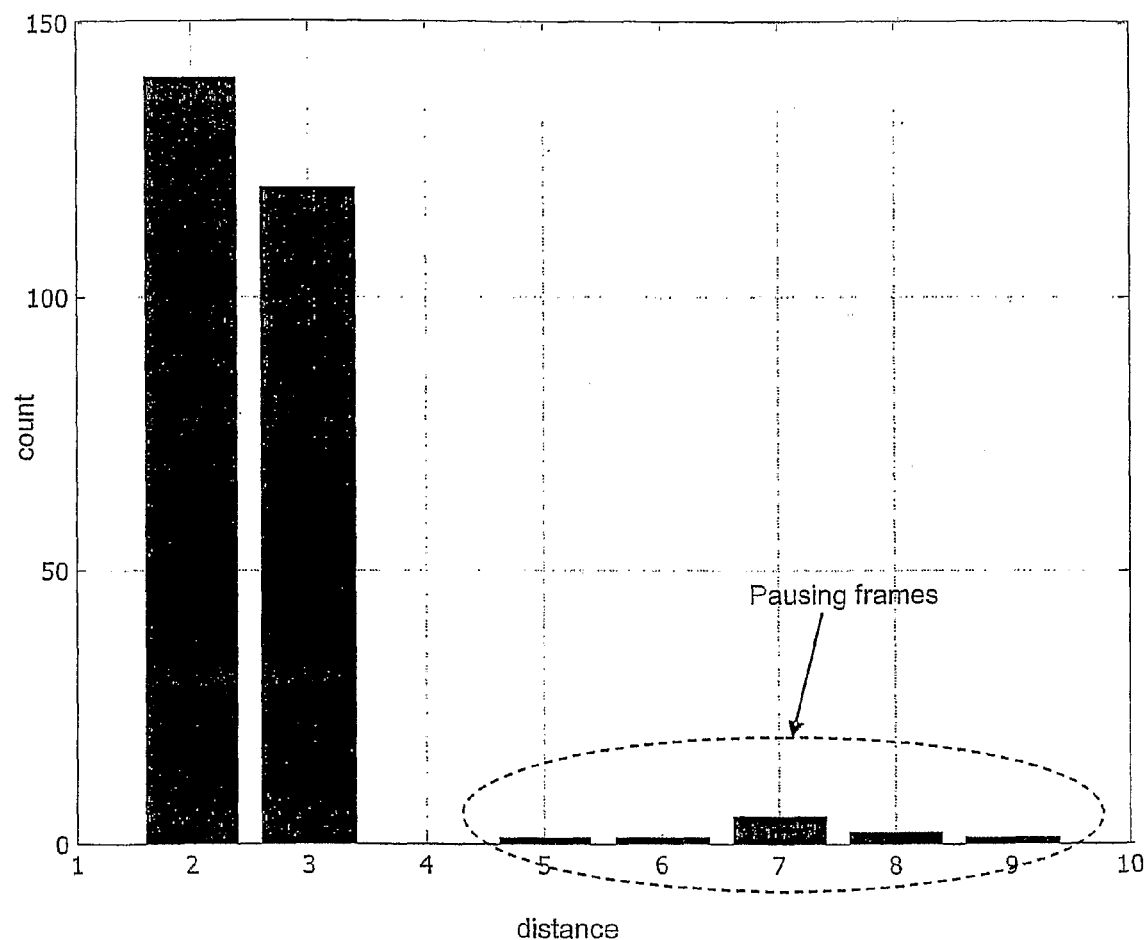
FIG. 9 is a histogram of the binned interframe distances in the presence of pausing.

Hence, as can be seen form FIG. 9, the pausing parameter p can be calculated from the sum of the bin values H(i) for i above a given threshold. This threshold should be higher than the downsampling factor DS. In order to avoid a wrong estimation of pausing, a guard distance of one unit between bars caused by downsampling and those caused by pausing should be used (in FIG. 9, bin number 4 is a guard unit). Hence, pausing can be calculated from the sum $$\sum_{i=2+ceil(DS)}^{N} H(i) \qquad (7)$$

wherein N designates the number of bins. Advantageously, the sum is normalized by the total number of frames, i.e. the pausing parameter p can be calculated from $$p = \frac{\sum_{i=2+ceil(DS)}^{N} H(i)}{\sum_{i=1}^{N} H(i)} \qquad (8)$$

Keyframe Distance Parameter KFD

A keyframe or I-Frame is a single frame in a video sequence that is compressed without making reference to any previous or subsequent frame in the sequence, i.e. each keyframe carries full information for creating a frame without reference to another frame. In contrast to this, non-keyframes carry incremental information for creating a frame from a previous frame. For television systems, an I-frame is sent typically every half second in order to enable zapping. I-frames are the only frames in a video data stream that can be decoded by their own (i.e., without needing any other frames as reference).

In video sequences with severely impaired content the perceived quality of keyframes strongly differs from that of other frames. In cases where the frame is content doesn't change drastically, the short raises of quality are visible as spikes in the interframe similarity s(i). The larger these spikes are in respect to the remaining signal, the lower video quality of the signal is. The present method uses this property to derive another quality parameter, the keyframe distance parameter KFD from the value of the interframe similarity s(i) at the keyframes.

The interframe similarity s(i) presented in FIG. 3 is a good example of this, the periodically arising spikes being indicators for key frames. Hence, the keyframes can be identified by checking if the interframe similarity s(i) or a value derived from the interframe similarity s(i) lies in a given range.

To enhance the spikes in s(i), the second derivative of the histogram similarity signal is taken in an advantageous embodiment of the invention. Calculating the second derivate increases the difference between the spikes and the remaining signal (i.e. works as high pass filter).

Figure 10:
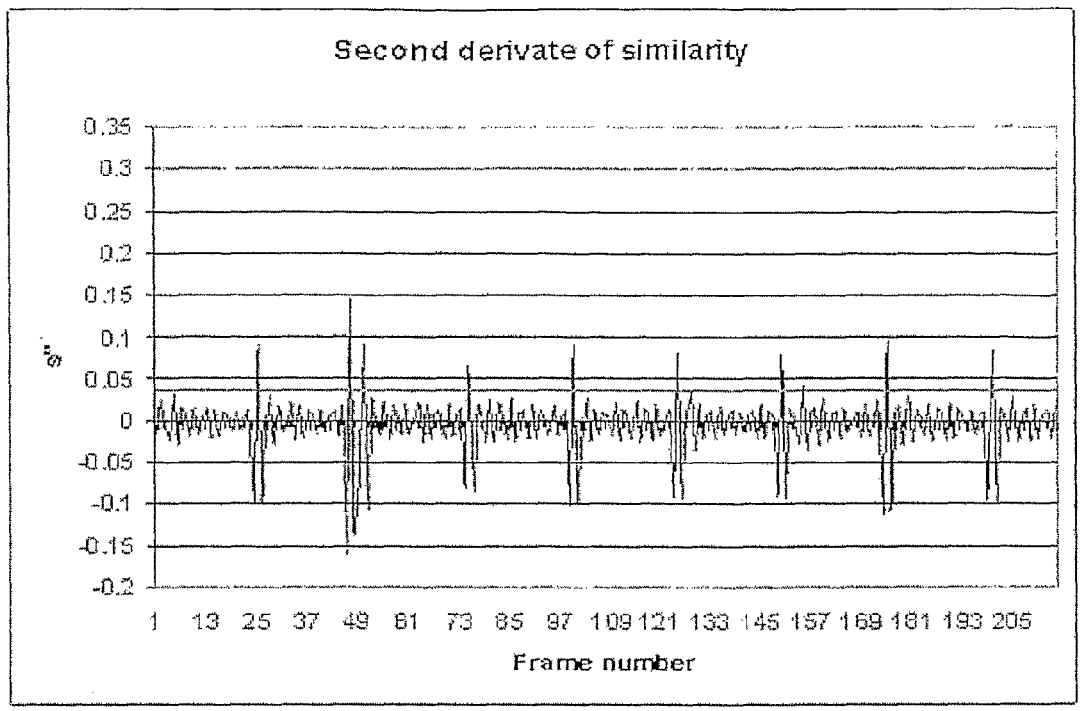
FIG. 10 shows the second derivative of the interframe similarity of a higher quality sequence.
Figure 11:
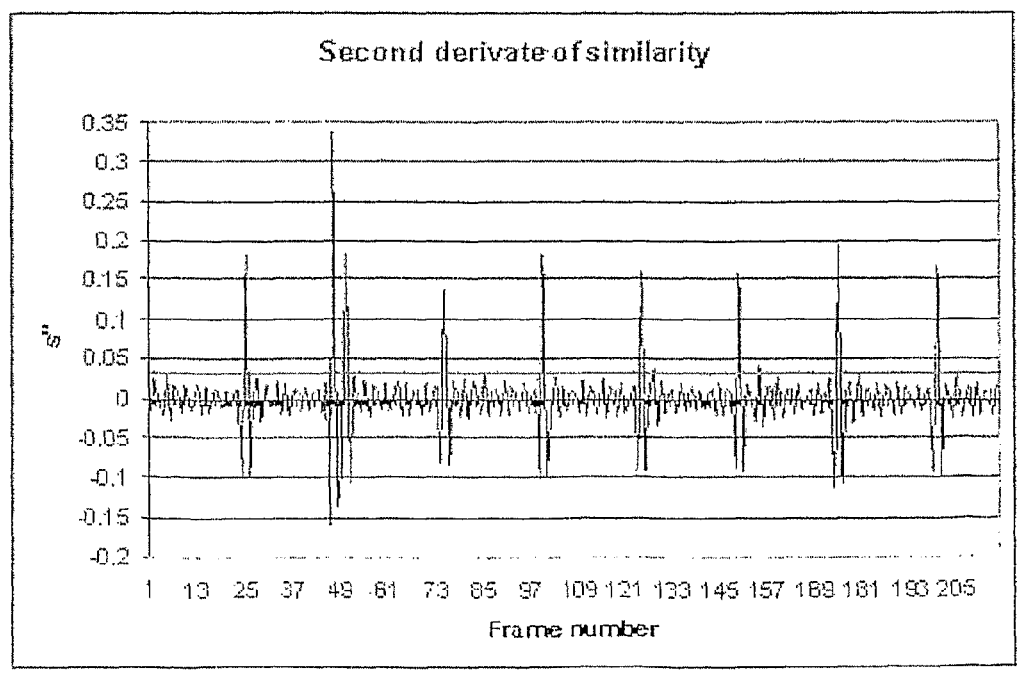
FIG. 11 shows the second derivative of the interframe similarity of a lower quality sequence.

FIGS. 10 and 11 are two examples for the second derivative of the interframe similarity s(i). FIG. 10 corresponds to a sequence with less compression (higher image quality). Therefore the amplitude of the spikes is lower then of those of FIG. 11.

Keyframes are detected by comparing the second derivative of s(i) (or any other suitable value derived from s(i)) with a lower threshold (lower dotted line in FIGS. 10, 11). If the value exceeds this threshold, the frame may be a keyframe.

The lower threshold has been introduced to reject noise produced by normal content changes between successive frames. It may e.g. have a value of 0.03.

However, both figures show one dominating, outlying spike, which indicates a shot boundary (scene change). To avoid a false keyframe detection at this frame, an upper threshold (upper dash-dotted line) of e.g. 0.3 has been introduced. If a spike exceeds this threshold, it is considered a "false alarm" and the spike is not used in further calculations. Another threshold (lower dash-dotted line) has been introduced to reject noise produced by normal content changes between successive frames.

The keyframe parameter (or key frame distance metric) KFD is then calculated by $$KFD = \frac{1}{M} \sum s_i - TH_L \qquad (9)$$

with the sum running over all detected keyframes I, M being the total number of keyframes and $TH_L$ the lower threshold.

The keyframe parameter KFD of Eq. (9) is the average (mean) of the interframe similarities s(i) inside the band limited by the two thresholds, minus the value of the lower threshold (to align the lowest possible result towards zero).

A simplified algorithm for calculating the keyframe parameter may e.g. look as follows:

```
d = 0, n = 0
for every element in s"
    if (s" (i) >= TH1 & s" (i) <= THu)
        d = d + s" (i)
        n = n + 1
end
if (n > 0)
    d = d/n – TH1;
``` where s" is the second derivative of the interframe similarity s(i).

Perceptual Mapping

With the steps mentioned so far, the downsampling factor DS, the pausing parameter p, and the keyframe distance parameter KFD can be derived. Additional parameters $S_1$ ... $S_p$ describing the spatial quality of the frames can be derived by means of the spatial analysis, as mentioned above.

All the measured parameters are then converted into the objective mean opinion score MOSo. In general, this is carried out by calculating $$MOSo = F(DS, p, KFD, S_1, \ldots S_p), \qquad (10)$$

where F is a linear or non-linear function in its parameters DS, p, KFD, and $S_1$ through $S_p$.

It has been found that function F is best split up in a non-linear part depending on the downsampling rate, while the influence of the other parameters can be expressed in a linear function. In particular, the following approach has been found to successfully describe the MOSo:

$$MOSo = M(p, KFD, S_1, \ldots S_P) + \Delta_{MOS}, \qquad (11)$$

where M is linear in its arguments and Amos is an additive correction described below.

Figure 12:
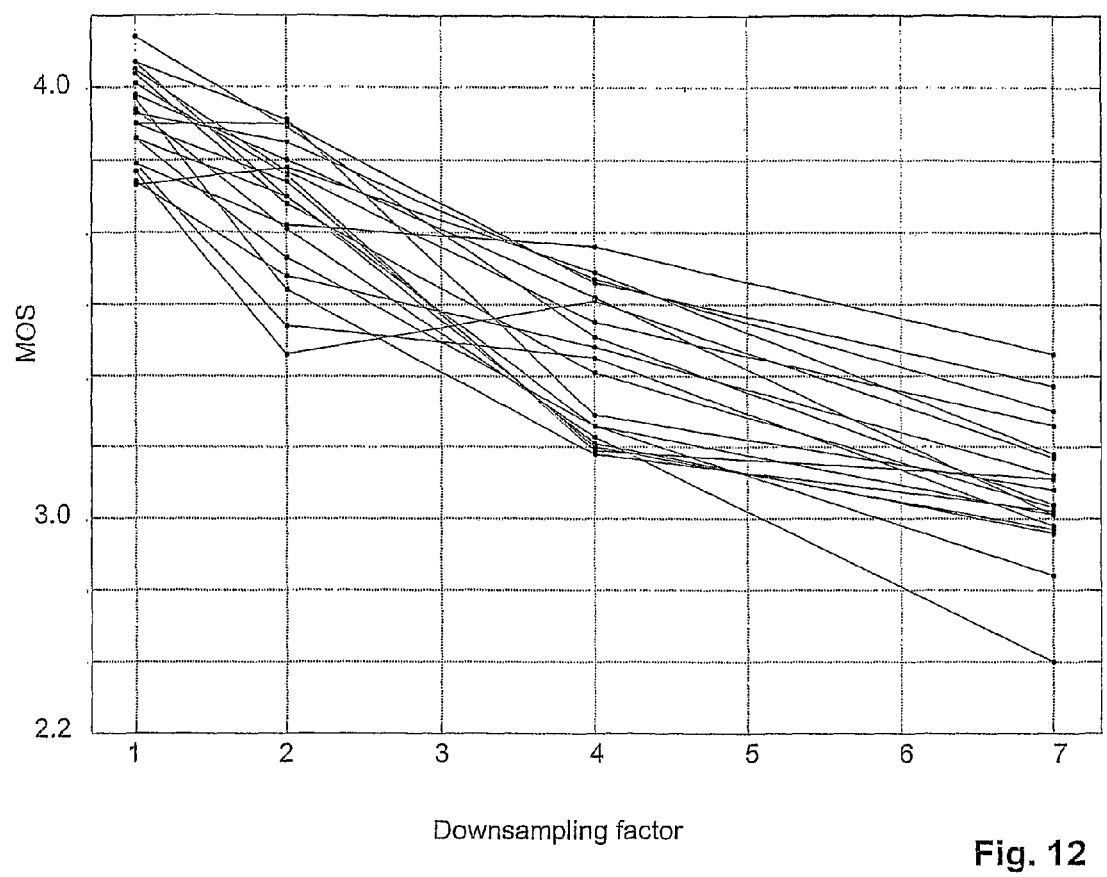
FIG. 12 shows the relation between the downsampling factor DS and the perceived video quality MOS.

A particularly important parameter is the downsampling factor DS. FIG. 12 shows the relation between the downsampling factor DS and the perceived video quality of a number of subjects. Each connected line represents a source played at different frame rates.

To fit a nonlinear model to the given data, the results are grouped per downsampling factor and then averaged. These averages are vertically shifted in such a way that a downsampling factor 1 (no downsampling) refers to no difference on the MOS scale.

It has been found that an exponential model describes the dependency of the change in MOS and the downsampling factor DS fairly well:

$$\Delta_{MOS} = A \cdot E^{-B \cdot DS} + C \quad (12)$$

The coefficients were examined for each image format (such as QCIF at 176×144 pixels, CIF at 352×288 pixels and VGA) separately. It is noticeable that the influence of the downsampling factor doesn't drastically change over the different image sizes.

| Image size | A | B | C |
|---|---|---|---|
| QCIF | 1.8290 | 0.2057 | −1.4807 |
| CIF | 1.6298 | 0.2635 | −1.2683 |
| VGA/PAL | 1.6147 | 0.2163 | −1.3147 |

Once the value $\Delta_{MOS}$ is known, the calculation of MOSo proceeds according to Eq. (11).

Function M of Eq. (11) is described by:

$$MOSo - \Delta_{MOS} = M(p, KFD, S_1, \ldots S_P) = \quad (13)$$
$$k_0 + k_p \cdot p + k_{KFD} \cdot KFD + k_{S1} \cdot S_1 + k_{S2} \cdot S_2 + \ldots$$

where the coefficients $k_0$, $k_p$, $k_{KFD}$, $k_{S1}$ etc. can be derived by carrying out the following steps:

1) Present a series of N video sequences $V_1, \ldots V_N$ to test persons who attribute mean opinion scores MOS(i) (for i=1 to N) to each of them.

2) Calculate the parameters DS(i), p(i), KFD(i), $S_1(i)$, $S_2(N)$ for each video sequence $V_i$. Calculate $\Delta_{MOS}$ from DS(i) using the coefficients in the table above.

3) Use linear regression to find those coefficients $k_0$, $k_p$, $k_{KFD}$, $k_{S1}$, etc. in Eq. (13).

To further improve the present algorithm, different functions F (in Eq. (10)) or different coefficients M (in Eq. (13)) can be used for differing frame sizes i.e. for different numbers of pixels per frame.

Typical values for the coefficients $k_p$, $k_{KFD}$ have been found (for a MOSo-$\Delta_{MOS}$ in arbitrary units) to be $k_p$=0.389 and $k_{KFD}$=−0.564 for the definitions of Eq. (8) and (9) above.

A further improvement can be achieved by taking into account that, if one disturbance becomes strong, the watcher user tends to weigh it in non-linear fasion. For example, in the presence of significant pausing, the average user tends to ignore most other errors in an image. To take this into account, different functions F (in Eq. (10)) or different coefficients M (in Eq. (13)) if a given quality parameter becomes dominant. This can be implemented by the following steps:

1) Calculating the parameters KFD and p for a given video sequence.

2) Comparing the parameters KFD and p to given thresholds $th_{KFD}$ and $th_p$ and, depending on the result of this comparison, using another function F (or coefficients for the function M).

Suitable functions F (or coefficients M) can again be derived from testing a series of video sequences with a group of users and finding an optimum match.

While there are shown and described presently preferred embodiments of the invention, it is to be distinctly understood that the invention is not limited thereto but may be otherwise variously embodied and practiced within the scope of the following claims.

The invention claimed is:

1. A method for assessing the quality of a video sequence, which is output by a video capture device, by attributing at least one score MOSo to said sequence, said method comprising the steps of
calculating a series of interframe similarities s(i) of said sequence, each interframe similarity s(i) indicative of a similarity of two consecutive frames in said sequence,
using said interframe similarities s(i) for calculating said score MOSo,
calculating a downsampling factor DS from said interframe similarities s(i) and using said downsampling factor DS for calculating said score MOSo,
comparing said interframe similarities s(i) to a first threshold value, an interframe similarity s(i) being less than the first threshold value indicating a frame change between frames i−1 and i, thus allowing a calculation of a series of interframe distances between frame changes,
binning said interframe distances for calculating a series of bin values H(i), with bin i corresponding to an interframe distance i, and
calculating said downsampling factor DS from the largest bin values,
wherein said downsampling factor DS is calculated from $$DS = \frac{i1 \cdot H(i1) + i2 \cdot H(i2)}{H(i1) + H(i2)},$$

with bins i1 and i2 being the bins with the two largest bin values H(i1), H(i2).

2. The method of claim 1 wherein an interframe similarity s(i)=k is indicative of two consecutive frames being identical and wherein said first threshold is k.

3. The method of claim 1 comprising the step of calculating a pausing parameter p, indicative of pausing in said sequence, from said interframe similarities s(i) and further comprising the step of using said pausing parameter p for calculating said score MOSo.

4. The method of claim 3 further comprising the step of calculating said pausing parameter p from a sum of the bin values H(i) for i above a given threshold.

5. A method for assessing the quality of a video sequence, which is output by a video capture device, by attributing at least one score MOSo to said sequence, said method comprising the steps of
calculating a series of interframe similarities s(i) of said sequence, each interframe similarity s(i) indicative of a similarity of two consecutive frames in said sequence,
using said interframe similarities s(i) for calculating said score MOSo,
calculating a pausing parameter p, indicative of pausing in said sequence, from said interframe similarities s(i) and further comprising the step of using said pausing parameter p for calculating said score MOSo,
comparing said interframe similarities s(i) to a first threshold value, an interframe similarity s(i) being less than the first threshold value indicating a frame change between frames i−1 and i, thus allowing a calculation of a series of interframe distances between frame changes, binning said interframe distances for calculating a series of bin values H(i), with bin i corresponding to an interframe distance i, calculating said pausing parameter p from a sum of the bin values H(i) for i above a given threshold, wherein said pausing parameter p is calculated from the sum $$\sum_{i=2+ceil(DS)}^{N} H(i)$$

wherein N designates the number of bins.

6. The method of claim 5 wherein said pausing parameter p is calculated from $$p = \frac{\sum_{i=2+ceil(DS)}^{N} H(i)}{\sum_{i=1}^{N} H(i)}.$$

7. The method of claim 1 wherein some of the frames of said sequence are transmitted as keyframes and some of the frames are transmitted as non-keyframes, wherein said keyframes carry full information for creating a frame without reference to a prior frame and said non-keyframes carry incremental information for creating a frame from a previous frame, said method comprising the steps of deriving a keyframe distance parameter KFD from the interframe similarities s(i) at said keyframes, and using said keyframe distance parameter KFD for calculating said score MOSo.

8. The method of claim 7 further comprising the step of identifying said keyframes by checking if said interframe similarity s(i) or a value derived from said interframe similarity s(i) lies in a given range.

9. The method of claim 8 comprising the step of comparing said interframe similarities s(i) or said value derived from said interframe similarities s(i) to a lower threshold and an upper threshold for identifying said keyframes.

10. A method for assessing the quality of a video sequence, which is output by a video capture device, by attributing at least one score MOSo to said sequence, said method comprising the steps of calculating a series of interframe similarities s(i) of said sequence, each interframe similarity s(i) indicative of a similarity of two consecutive frames in said sequence, using said interframe similarities s(i) for calculating said score MOSo, calculating a downsampling factor DS from said interframe similarities s(i) and using said downsampling factor DS for calculating said score MOSo, wherein some of the frames of said sequence are transmitted as keyframes and some of the frames are transmitted as non-keyframes, wherein said keyframes carry full information for creating a frame without reference to a prior frame and said non-keyframes carry incremental information for creating a frame from a previous frame, said method further comprising the steps of deriving a keyframe distance parameter KFD from the interframe similarities s(i) at said keyframes, using said keyframe distance parameter KFD for calculating said score MOSo, and calculating said score MOSo from $MOSo = F(DS, p, KFD, S_1, \ldots S_P)$ where DS is a downsampling factor, p is a pausing parameter indicative of pausing in said video sequence, and $S_1, \ldots S_P$ are any further quality parameters of said video sequence, F being a function which is equal to the sum of a linear function M of p, KFD, and $S_1, \ldots S_P$ and a non-linear function of DS, and in particular wherein said method further comprises the steps of calculating the parameters KFD and p for the video sequence and comparing the parameters KFD and p to given thresholds $th_{KFD}$ and $th_p$ and, depending on the result of this comparison, selecting another function F.

11. The method of claim 7 wherein said keyframe distance parameter KFD is derived from an average value of the interframe similarities s(i) at said keyframes.

12. Use of the method of claim 1 for determining the quality of a video transmission channel.

* * * * *